US009231265B2

(12) United States Patent
Lund-Olesen et al.

(10) Patent No.: US 9,231,265 B2
(45) Date of Patent: Jan. 5, 2016

(54) FUEL CELL, A PORTABLE ELECTRONIC DEVICE AND A METHOD OF MANUFACTURING A FUEL CELL RESERVOIR

(75) Inventors: Torsten Lund-Olesen, København V (DK); Christian Kallesoee, København Ø (DK); Jan Harry Hales, Søborg (DK); Leif Hoejslet Christensen, Roskilde (DK)

(73) Assignee: TEKNOLOGISK INSTITUT, Taastrup (DK)

( * ) Notice: Subject to any disclaimer, the term of this patent is extended or adjusted under 35 U.S.C. 154(b) by 200 days.

(21) Appl. No.: 14/232,045

(22) PCT Filed: Jul. 13, 2011

(86) PCT No.: PCT/DK2011/000082
§ 371 (c)(1),
(2), (4) Date: Feb. 6, 2014

(87) PCT Pub. No.: WO2013/007256
PCT Pub. Date: Jan. 17, 2013

(65) Prior Publication Data
US 2014/0147771 A1 May 29, 2014

(51) Int. Cl.
*H01M 8/04* (2006.01)
*H01M 8/10* (2006.01)

(52) U.S. Cl.
CPC ........ *H01M 8/1002* (2013.01); *H01M 8/04186* (2013.01); *H01M 8/04201* (2013.01); *H01M 8/04402* (2013.01); *H01M 8/1009* (2013.01); *H01M 8/1011* (2013.01); *H01M 8/1013* (2013.01); *H01M 2008/1095* (2013.01); *H01M 2250/30* (2013.01); *Y02B 90/18* (2013.01); *Y02E 60/523* (2013.01)

(58) Field of Classification Search
CPC ................. H01M 2008/1095; H01M 2250/30; H01M 8/04186; H01M 8/04201; H01M 8/04402; H01M 8/1002; H01M 8/1009; H01M 8/1011; H01M 8/1013; Y02B 90/18; Y02E 60/523
USPC .................. 429/424, 425, 462, 513, 515, 516
See application file for complete search history.

(56) References Cited

U.S. PATENT DOCUMENTS

2004/0062979 A1   4/2004   Beckmann et al.
2004/0209136 A1   10/2004  Ren et al.

FOREIGN PATENT DOCUMENTS

WO        2005/029609 A2    3/2005

OTHER PUBLICATIONS

International Search Report of PCT/DK2011/000082, dated May 2, 2012.
Shi-Chune Yao, et al., "Micro-electro-mechanical systems (MEMS)-based micro-scale direct methanol fuel cell development", Science Direct, Energy 31, 2006, pp. 636-649.

*Primary Examiner* — Patrick Ryan
*Assistant Examiner* — Ben Lewis
(74) *Attorney, Agent, or Firm* — Sughrue Mion, PLLC

(57) ABSTRACT

A fuel cell for a portable electronic device having a liquid fuel reservoir (100) wherein at least a part of the inner surface (103) and a part of an outer surface (104) of the fuel reservoir wall (102) are gas permeable, wherein said wall is adapted such that the area of the open parts of the inner surface (103) of the wall is larger than the area of the open parts of said outer surface (104) of the wall, wherein said wall is porous and adapted to allow gas to enter said wall and to be transported along said wall in a direction substantially parallel with the plane of the wall and to leave said wall, and wherein said wall is adapted such that the inner surface is hydrophobic. The invention further provides a portable electronic device and a method of manufacturing a liquid fuel reservoir.

18 Claims, 3 Drawing Sheets

FUEL CELL, A PORTABLE ELECTRONIC DEVICE AND A METHOD OF MANUFACTURING A FUEL CELL RESERVOIR

CROSS REFERENCE TO RELATED APPLICATIONS

This application is a National Stage of International Application No. PCT/DK2011/000082 filed Jul. 13, 2011, the contents of all of which are incorporated herein by reference in their entirety.

FIELD OF THE INVENTION

The present invention relates to fuel cells. The invention also relates to portable electronic devices comprising a fuel cell. Further the present invention relates to a method of manufacturing a fuel cell reservoir.

BACKGROUND OF THE INVENTION

In the context of the present disclosure a portable electronic device should be understood as a small microelectronic device designed to be worn on the human body. Especially the devices may be adapted to be at least partly worn at or in the human ear. Examples of such devices include hearing aids and some types of portable electronic sensor systems.

A variety of bearing aid types exist and a few of these are further described below. Behind-The-Ear (BTE) hearing aids are worn behind the ear. To be more precise an electronics unit comprising a housing containing the major electronics parts thereof is worn behind the ear. An earpiece for emitting sound to the hearing aid user is worn in the ear, e.g. in the concha or the ear canal. A connector connects the earpiece to the housing. In a traditional BTE hearing aid, a sound tube is used because the output transducer, which in hearing aid terminology is normally referred to as the receiver, is located in the housing of the electronics unit. In some modern types of hearing aids a conducting member comprising electrical conductors is used, because the receiver is placed in the earpiece in the ear. Such hearing aids are commonly referred to as Receiver-In-The-Ear (RITE) hearing aids. In a specific type of RITE hearing aids the receiver is placed inside the ear canal. This is known as Receiver-In-Canal (RIC) hearing aids.

In-The-Ear (ITE) hearing aids are designed for arrangement in the ear, normally in the funnel-shaped outer part of the ear canal. In a specific type of ITE hearing aids the hearing aid is placed substantially inside the ear canal. This type is known as Completely-In-Canal (CIC) hearing aids. This type of hearing aid requires a very compact design in order to allow it to be arranged in the ear canal, while accommodating the components necessary for operation of the hearing aid.

Other types of hearing aids include cochlear implants and bone conducting hearing aids. Other devices that resemble hearing aids are e.g. devices for the treatment of tinnitus and devices for relieving stress and anxiety.

A great variety of portable electronic sensor systems exist that qualify as portable electronic devices in the context of the present disclosure. One variety is systems comprising means for EEG monitoring. These systems are applicable for a lot of medical purposes such as:

monitoring the users brain waves for evaluation of the result of a medical treatment;

monitoring the user's brain waves for detection of medical states, and possibly alerting the user, caretakers or relatives, wherein examples of such medical states are e.g. impending hypoglycemia and epileptic seizures;

monitoring the user's brain waves for the purpose of diagnosing medical conditions.

Examples of such conditions are epileptic conditions such as absence epilepsy, neurodegenerative conditions such as Parkinson's disease and psychiatric disorders such as Schizophrenia or Anxiety disorders;

providing Audio Feedback for the purpose of treating a disease or a disorder such as Attention Deficit Hyperactivity Disorder (ADHD), tinnitus or phantom pain sensations; and providing a Brain-Computer Interface or Man-Machine Interface for enabling the user to control the device it-self or for controlling peripheral devices.

Other types of portable electronic devices within the context of the present disclosure further include e.g. cameras, mobile phones and remote controls.

A fuel cell for a portable electronic device is restricted with respect to operating temperature, size, duration of fuel cell operation before re-fuelling is required, magnitude of the output voltage, possible safety issues related to the general fuel cell handling and the range of allowable operating orientations.

A fuel cell for a portable electronic device is capable of functioning at room temperature and encompasses a volume of less than 50 $cm^3$.

A number of fuel cells have the potential to fulfill the above mentioned requirement including e.g. Direct Alcohol Fuel Cells (DAFCs), wherein Direct Methanol Fuel Cells (DMFCs) is a particular attractive type, and Direct Formic Acid Fuel Cells (DFAFCs). Further details concerning DMFCs can be found e.g. in U.S. Pat. No. 5,599,638.

This category of fuel cells generally comprises cells using a polymer electrolyte membrane, also referred to as a proton exchange membrane, where the protons are supplied through a catalytic process of the fuel. In the direct alcohol fuel cell (DAFC) an alcohol is directly oxidized. The most widely used fuel in the DAFC is methanol, thus termed direct methanol fuel cell (DMFC).

Pure methanol and ethanol have 17 and 20 times larger energy density by weight, respectively, than e.g. a type 312 Zn-Air battery. When comparing energy density by volume the numbers are 4 and 5 times, thus, ideally providing at least a 4-fold increase in operating time (not counting the system volume of the fuel cell). Furthermore, the fuel cell will be capable of being recharged in a matter of minutes by simply replenishing the fuel. Finally the energy required to manufacture Zn-Air batteries is typically orders of magnitude larger than the energy required to manufacture e.g. a DMFC.

Rechargeable nickel-metal hydride (NiMH) batteries are also available in typical hearing aid battery sizes. These batteries have a capacity in the range between 10 and 70 mAh, which is only one tenth of the corresponding Zn-air batteries.

The technology of a DAFC can roughly be divided into three main fields; the polymer electrolyte membrane, the catalysts/electrode part and the general system/cell structuring. The latter ensures that the fuel reaches the catalyst layer where it is electrochemically oxidized to form, in the case of alcohols, electrons, protons and carbon dioxide. As the membrane ideally only allows proton conduction (strictly speaking it is $H_3O^+$ that is conducted through the membrane), the free electrons are conducted by the electrode layer through an external load and returned to the cathode side. On this side the system structuring allows a flow of air thus providing oxygen, which in term is reduced by the catalyst to form water together with the electrons from the connected load and the protons conducted through the membrane.

Reference is now made to FIG. 6 which illustrates highly schematically a fuel cell for a portable electronic device according to the prior art. The fuel cell 10 comprises a Proton Exchange Membrane (PEM) 11, a negative electrode (anode) 12, a positive electrode (cathode) 13, a fuel reservoir 14, an anode fuel inlet 15, an anode outlet 16 (for removal of the gas produced at the anode), a cathode inlet 17 and a cathode outlet 18 (for removal of the water produced at the cathode). The fuel cell 10 provides current to the external electrical load 20 via the electrical connectors 21a and 21b, which connects the electrical load 20 with the anode 12 and the cathode 13.

Common to all the above mentioned fuel cells is that they generate $CO_2$ or an intermediate. It is a well known issue in any $CO_2$ generating fuel cell that the $CO_2$ needs to be somehow transported out of the fuel cell.

Due to the size limitations imposed on fuel cells for portable electronic devices active components for pumping of fluids in the fuel cells are not an option and the $CO_2$ therefore has to be managed passively.

It is known in the art of fuel cells to provide passive degassing using bubble actuated pumping principles. Such systems are known from e.g. the article "Capillary-driven pumping for passive degassing and fuel supply in direct methanol fuel cells" in Micro fluidics and Nano fluidics, vol. 7, no. 5, 2009 by Paust et al.

However, even such passive systems are not suitable for fuel cells for portable electronic devices due to the size limitations.

Additionally, the use of portable electronic devices is generally characterized by the fact that the orientation of the device, and hence the fuel cell, is not known in advance and may even change during normal operation. This may be a problem since many designs rely on gravity to assist in removing the $CO_2$ bubbles from the Membrane Electrode Assembly (MEA) and to a gas permeable valve. Consequently passive degassing based on a gas permeable exit hole or membrane valve is not well suited for portable electronic devices, because the formed $CO_2$ may tend to remain at, and therefore block, the fuel cell MEA instead of leaving it.

Another issue with systems based on a gas permeable exit hole or membrane valve is that liquid fuel will tend to be pressed out instead of the $CO_2$ if the $CO_2$ does not reach the exit hole.

It is therefore a feature of the present invention to provide a fuel cell for a portable electronic device with improved performance.

It is yet another feature of the present invention to provide a method of manufacturing such fuel cell reservoir.

SUMMARY OF THE INVENTION

The invention in a first aspect provides a fuel cell according to claim 1.

This provides a fuel cell with improved performance.

The invention in a second aspect provides a portable electronic device according to claim 15.

The invention in a third aspect provides a method of manufacturing a fuel cell reservoir according to claim 17.

Further advantageous features appear from the dependent claims.

Still other features of the present invention will become apparent to those skilled in the art from the following description wherein the invention will be explained in greater detail.

BRIEF DESCRIPTION OF THE DRAWINGS

By way of example, there is shown and described a preferred embodiment of this invention. As will be realized, the invention is capable of other different embodiments, and its several details are capable of modification in various, obvious aspects all without departing from the invention. Accordingly, the drawings and descriptions will be regarded as illustrative in nature and not as restrictive. In the drawings.

DETAILED DESCRIPTION

Figure 1:
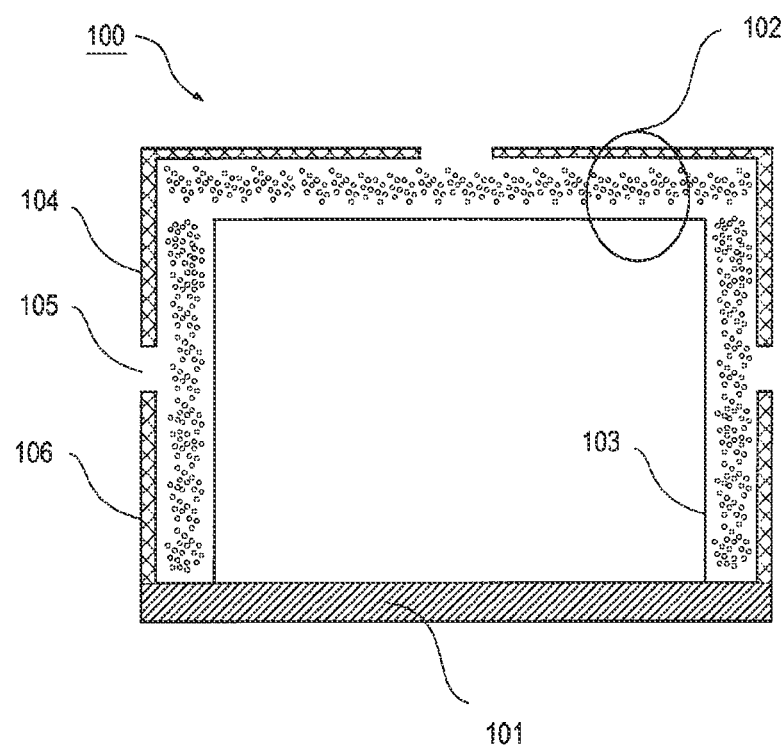
FIG. 1 illustrates highly schematically a fuel cell for a portable electronic device according to an embodiment of the invention.

Using the fuel cell according to the invention it has surprisingly been demonstrated that passive operation of a fuel cell can be obtained by providing a wall of the fuel reservoir in a porous material and making the inner surface of said wall hydrophobic and gas permeable.

Due to the hydrophobic inner surface of the fuel reservoir, gas bubbles, generated as part of the chemical reaction in the fuel cell, will be dragged away from the MEA, where the chemical reaction is taking place, and towards the reservoir wall, as soon as contact is made between the gas bubble and the fuel reservoir wall. Once the gas bubbles are moved to the hydrophobic and gas permeable fuel reservoir wall, the gas bubbles will no longer obstruct the flow of liquid fuel to the MEA and will slowly be transported through the reservoir wall. Hereby is provided a fuel cell with an effective and passive gas management system that occupies an absolute minimum of space and is capable of operating over a wide range of device orientations.

Additionally the efficient removal of the gas produced as part of the chemical reaction taking place in the fuel cell substantially prevents liquid fuel from being pressed out of the fuel cell because the pressure in the fuel reservoir is maintained at an uncritical low level.

It has further been found that a porous fuel reservoir wall can effectively be adapted such that gas produced as part of the chemical reaction taking place in the fuel cell can be removed before the pressure in the fuel reservoir increases to levels that are critical, while at the same time keeping loss of fuel due to diffusion through the porous wall low.

To achieve this the average diameter of the pores in the inner part of the wall is on one hand so small that the liquid fuel cannot enter the pores and on the other hand so large that the flow resistance for the gas to be transported out of the fuel reservoir is so low that the pressure in the fuel reservoir doesn't increase to levels that are undesirable.

Furthermore the area of the open parts of the inner surface of the wall is larger than the area of the open parts of an outer surface of the porous wall whereby diffusion through the wall is reduced in accordance with the relative size of said areas. The area of the open parts in a surface of a porous material is defined as the area of the open pores in the surface.

In the context of the present invention the term "gas permeable parts" denotes an area that comprises both the open and solid areas of the porous material. This term is therefore convenient in describing e.g. the area of the gas permeable parts relative to the area of e.g. the inner surface 103 without taking the porosity of the wall material into account. The term "open parts", on the other hand, is convenient for describing e.g. the case where the areas of the gas permeable parts of the inner surface 103 and the outer surface 104 are identical and the areas of the corresponding open parts differ only due to a difference in porosity on the inner surface 103 and the outer surface 104. Thus the term "open parts" refers to the porous openings in a surface of the fuel reservoir wall.

A specific relative size of the areas of the open parts in the inner and an outer surface can therefore be achieved by blocking some pores (e.g. by applying a gas impermeable coating onto a part of one of the porous surfaces) or by varying the average pore diameter and/or the porosity of the material for one surface relative to the other.

It has been found that the increased flow resistance caused by the small area of the open parts of an outer surface relative to the open parts of the inner surface does not increase the reservoir pressure to such a degree that leakage is caused.

Reference is first made to FIG. 1, which illustrates highly schematically selected parts of a fuel cell for a portable electronic device according to an embodiment of the invention. The selected parts of the fuel cell include a fuel reservoir 100 comprising a membrane electrode assembly (MEA) 101 and a fuel reservoir wall 102 having an inner surface 103 and an outer surface 104. The outer surface 104 comprises both gas permeable parts 105 and gas impermeable parts 106. The hydrophobic inner surface 103 is made hydrophobic in order to prevent leakage of liquid fuel through the fuel reservoir wall 102 and in order to attract a gas bubble as soon as the gas bubble touches the inner surface 103.

In the present context the term MEA is to be understood as a part that may include supporting structures and/or mass flow resistant structures adapted to allow the use of liquid fuel with a high methanol concentration by providing a lower methanol concentration at the active surface of the MEA.

According to the embodiment of FIG. 1 the fuel reservoir wall 102 is partly porous and gas permeable such that gas can be transported through the wall 102 both in directions substantially perpendicular to the plane of the wall and in directions substantially parallel with the plane of the wall, as will be further discussed below with reference to FIGS. 2-5. The fuel reservoir wall 102 consists of a gas impermeable acrylic outer part and an inner porous part. The outer part is formed as a cylinder that is closed in one end and has a diameter of 10 mm, a height of 6 mm and the thickness of the part is 1 mm hereby providing a fuel cell reservoir volume of 470 $mm^3$. The outer part further comprises 5 holes, each with a diameter of 1 mm. These holes constitute the gas permeable parts of the outer surface. The relative area of the open parts in the outer surface relative to the area of the open parts in the inner surface of the wall is therefore around 1.5% since the area of the holes is around 4 $mm^3$, the area of the outer surface is around 267 $mm^3$ and the porosity is the same at the inner and outer surface. The inner part consists of a porous PTFE sheet with a thickness of 250 um. The average pore diameter is in the range between 1 and 5 um and the porosity is in the range between 40 and 60%. The inner part is glued onto the outer part with epoxy glue such that the holes in the outer part are not blocked.

In variations of the embodiment according to FIG. 1 the gas impermeable parts 106 of the outer surface 104 of the fuel reservoir wall 102 are provided by treating the outer surface 104 with an appropriate coating.

According to the embodiment of FIG. 1 the inner surface 103 of the fuel reservoir wall 102 is hydrophobic due to the inherent material properties of the PTFE sheet which constitutes the porous material.

According to the embodiment of FIG. 1 a hydrophobic coating is applied in order to also make the inner surface of the gas impermeable parts of the outer surface 104 hydrophobic. It is suspected that this can minimize droplet formation, which may otherwise block the porous structures and therefore prevent that the gas produced as part of the chemical reaction in the fuel cell is transported out from the fuel reservoir. Additionally it is speculated that the droplet formation under some circumstances may lead to an increase in loss of fuel due to droplets that are efficiently transported out from the fuel reservoir wall.

In variations of the embodiment according to FIG. 1 the porous material is not inherently hydrophobic and the inner surface 103 and the interior of the porous material are therefore made hydrophobic by applying a hydrophobic coating.

In variations according the embodiment of FIG. 1, the outer surface 104 is not necessarily the outermost surface of the fuel reservoir wall 102. In the present context outer surface 104 is to be understood as a surface that is on the outside of the inner surface 103. In a specific variation the outer surface 104 can be positioned between two porous wall parts.

The embodiment of FIG. 1 is advantageous in that the major part of the inner surface 103 of the fuel reservoir wall is gas permeable. Efficient removal of gas is secured because a gas bubble cannot be trapped towards a fuel reservoir wall, simply because the whole inner surface 103 of the fuel reservoir wall basically is gas permeable. This makes the efficiency of the gas removal independent on the orientation of the fuel cell.

According to the embodiment of FIG. 1 the areas of said gas permeable parts of the inner surface 103 and outer surface 104 of the fuel reservoir wall 102 are selected such that the area of the gas permeable inner surface is larger than the total area of the gas permeable parts on the outer surface 104 and the gas permeable parts of the inner surface basically cover the whole inner surface 103. Hereby a gas bubble can be transported through the inner surface 103 of the fuel reservoir wall independent of the position of the gas bubble inside the fuel reservoir (as long as the gas bubble has either expanded to a size where it touches the inner surface 103 of the fuel reservoir wall 102 or has moved, under the influence of e.g. gravity, from the MEA and to a part of the inner surface of the fuel reservoir wall), whereby the gas bubble enters the bulk of the wall, wherein the bubble may propagate until it reaches a gas permeable part of the outer surface where it can leave the fuel cell. Further, the evaporation of fuel from the fuel reservoir can be kept low due to the limited area of the gas permeable parts on the outer surface 104. According to the embodiment of FIG. 1 the porosity of the fuel reservoir wall is basically uniform and the relative size of the gas permeable parts on the inner surface 103 and the outer surface 104 will therefore be the same as the relative size of the open parts in the inner surface 103 and outer surface 104.

According to variations of the embodiment of FIG. 1, only selected parts of the inner surface 103 are gas permeable. According to one specific variation the gas permeable part of the inner surface 103 is provided in a band that surrounds and touches upon the edges that divide the fuel reservoir wall 102 and the MEA 101. This variation is advantageous in that the gas permeable area of the inner surface is limited whereby the evaporation of liquid fuel is likewise limited. According to another specific variation the gas permeable part of the inner surface 103 extends at least partially around the fuel cell reservoir volume such that at least two surface normal's extending from respective points at said part of the inner surface span an angle of at least 60 degrees, preferably at least 170 degrees. Hereby it is ensured that gas is likely to easily reach the wall in order for gas removal to be effective for a wide range of fuel cell orientations.

According to yet other variations of the embodiment of FIG. 1 the number of separate areas constituting the gas permeable parts of the outer surface of the fuel reservoir wall is in the range between 3 and 30. This range has turned out to be able to provide low fuel loss due to diffusion, low flow resistance for the gas to be transported out of the fuel reservoir and ease of manufacturing.

In variations according to the embodiment of FIG. 1 the gas permeable part of the outer surface 104 is less than 50%, preferably less than 5% of the total area of the outer surface 104 of the fuel reservoir wall.

According to further variations of the embodiment of FIG. 1 the area of the open parts of the outer surface is less than 50%, and preferably less than 5%, of the area of the open parts of the inner surface. Most preferably the area of the open parts of the outer surface is less than 2% of the area of the open parts of the inner surface. Hereby evaporation of fuel through the open parts of the fuel reservoir wall can be minimized while maintaining the benefit of an inner surface 103 that is substantially gas permeable.

According to still other variations of the embodiment of FIG. 1 the whole outer surface of the fuel reservoir wall is gas permeable and the low percentage of the area of the open parts of the outer surface relative to the area of the open parts of the inner surface is achieved by providing a low porosity at the outer surface compared to the porosity at the inner surface. These embodiments are advantageous in that the wall can be quite thin since the gas to be transported out of the fuel reservoir will only travel a relatively limited distance along the plane of the wall and the requirements to the wall thickness are therefore relaxed in order to decrease the flow resistance for gas propagating along said plane.

In variations of the embodiment according to FIG. 1 the fuel reservoir wall has an average pore size in the range between 100 and 1000 nm and a porosity in the range between 50 and 95%. Generally the higher porosity, with respect to the embodiment of FIG. 1, will reduce the flow resistance and increase the fuel evaporation. The decrease in flow resistance is advantageous because it lowers the pressure in the fuel reservoir and hereby the risk of liquid fuel being pressed through the pores. On the other hand the increase in fuel evaporation will be negligible because the area of the open parts on the outer surface is primarily determined by the size of the holes (i.e. the gas permeable parts) in the impermeable coating on the outer surface 104. The decrease in pore size, with respect to the embodiment of FIG. 1, will increase the flow resistance and hereby the pressure in the cell but the risk of liquid fuel being pressed through the pores will rather decrease than increase due to the smaller pore diameter despite the larger pressure. It is generally advantageous to decrease the risk of liquid fuel being pressed through the pores because it allows the use of fuels with higher methanol concentrations, since these fuels has a lower surface tension and therefore exhibits an increased risk of being pressed into the pores.

In further variations the thickness of the porous part of the fuel reservoir wall 102 is in the range between 50 um and 150 um. Generally it is desirable to decrease the thickness of the porous part in order to increase the amount of fuel that can be contained in the reservoir. However, if the porous part is too thin with respect to the distance that the gas must be propagate inside the wall, then the flow resistance of the gas will increase, which is not desirable.

In another variation of the embodiment according to FIG. 1, the inner surface of the porous material exhibits a very low average pore diameter in the range between 10 nm-500 nm, which is advantageous with respect to decreasing the risk of fuel being pressed through the pores. In a further variation the porosity and the average pore diameter increase significantly after a very short distance, that is in the range between 1 um and 50 um. This variation is advantageous in that the risk of liquid being pressed into the pores is reduced significantly while the flow resistance is not increased correspondingly.

According to variations of the embodiment of FIG. 1 the gas permeable parts 105 of the outer surface 104 are arranged in more and smaller parts or fewer and larger parts, in both cases such that the total area of the parts is maintained. In a specific variation the outer surface 104 does not comprise impermeable parts 106 as such, instead the difference in area of the open parts of the inner and outer surface is provided by a corresponding difference in the average pore diameter and/or the porosity of the wall material at the inner and outer surface respectively. According to a specific variation this can be achieved by manufacturing the wall from two parts with different values of the porosity.

According to variations of the embodiment of FIG. 1 the fuel cell is adapted to exhibit characteristics that at least partly correspond to characteristics of traditional hearing aid power sources. This may therefore imply restrictions with respect to size, operating temperature, magnitude of the output voltage, the stability of the output voltage, the duration of operation before the fuel cell requires re-fuelling and general fuel cell handling.

Therefore according to a specific variation the volume of the fuel cell is in the range between 75 mm$^3$ and 600 mm$^3$, whereby the size of the fuel cell corresponds to the most widely used hearing aid power sources.

The fuel cell according to the invention is particularly well suited for replacing traditional hearing aid power sources. The limited volume of traditional hearing aid power sources makes the use of other methods for degassing less attractive.

In order for the fuel cell to be suitable for use in a portable electronic device the fuel cell must be capable of providing an output voltage of at least a few tenths of a Volt, i.e. at least 0.1 Volt. On the other hand an output voltage larger than 10 Volt is not suitable for portable electronic devices. In order for the fuel cell to be suitable for use in a contemporary hearing aid the fuel cell must be capable of providing an output voltage in the range between 1.3 and 1.7 Volt. Some types of single fuel cell elements cannot provide a voltage of this magnitude and it is therefore required that these fuel cells comprise a multitude of stacked fuel cell elements in order to be suitable for use in contemporary hearing aids. Alternatively the hearing aid can be adapted to operate at the lower voltage.

Additionally, the fuel cell must be capable of continuous operation for at least a day, whereby a wearer of the portable electronic device is not required to re-fuel the fuel cell during daily operation and instead can carry out the re-fueling e.g. in the evening before going to sleep or in the morning after waking-up. In the present context a fuel cell for a portable electronic device must therefore have a capacity of at least say 10 mWh. In order for the fuel cell to be suitable for use in a hearing aid it is at present considered sufficient to provide a capacity in the range between 10 and 1000 mWh depending on the specific hearing aid type. Other types of portable electronic devices may require capacities up to say 10 000 mWh.

Finally it is required that the wearer of the portable electronic device can handle the fuel cell in a simple and safe manner.

In variations according to the embodiment of FIG. 1, the method for manufacturing the fuel reservoir wall 102 comprises the steps of: forming a three-dimensional computer model of the reservoir wall and manufacturing a porous reservoir wall 102 using a process based on said three-dimensional computer model. According to specific variations the step of manufacturing a porous wall is selected from a group of manufacturing processes comprising: selective laser sintering (SLS), metal injection molding (MIM) and ceramic injection molding (CIM).

According to a variation of said manufacturing methods metal powder (suitable for the MIM process) is mixed with space holding particles (such as PMMA) and metal injection molded and subsequently exposed to sintering conditions whereby a porous metal structure is formed, wherein the metal structure comprises pores with a diameter in the range of 10 um or less. Further details concerning this manufacturing method can be found e.g. in the article: "Net-shape manufacturing of micro porous metal components by powder injection molding" by Nishiyabu, Matsuzaki et al. in "Materials Science Forum (Vol. 534-536), page 981 984".

According to another variation of the embodiment according to FIG. 1, the method for manufacturing the fuel reservoir wall comprises the steps of: manufacturing a non-porous reservoir wall and applying a porous layer to a surface of the non-porous reservoir wall. According to specific variations the step of manufacturing a non-porous wall is selected from a group of manufacturing processes comprising: sheet metal forming, injection molding and rapid prototyping such as e.g. stereo lithography (SLA). According to further specific variations the step of applying a porous layer to a surface of the non-porous reservoir wall is selected from a group of manufacturing processes comprising: electroplating, spray-coating and metal sintering.

According to another variation of the embodiment according to FIG. 1, metal particles can be tape casted onto a metal plate and subsequently exposed to sintering conditions, whereby a porous plate is provided that is well suited for subsequent metal forming using e.g. sheet forming.

According to yet another variation of the embodiment according to FIG. 1, a fuel reservoir wall according to the invention is manufactured by combining a porous sheet and a non-porous sheet that can be manufactured using one or more of the manufacturing processes mentioned above. According to a specific variation sheet metal forming is subsequently used in order to achieve the desired shape of the fuel reservoir wall.

Reference is now made to FIGS. 2-5, which illustrate highly schematically how a gas bubble is vented out of a fuel reservoir according to the embodiment of FIG. 1.

Figure 2:
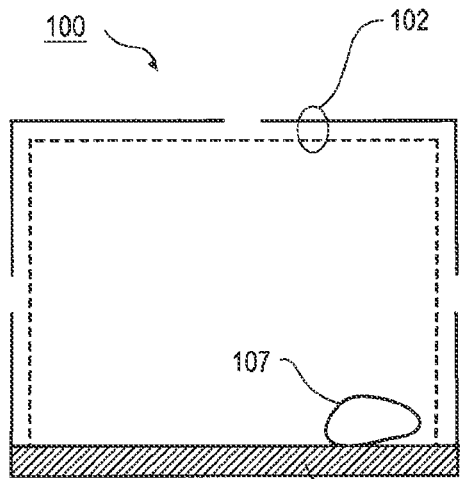
FIG. 2 illustrates a first step in the process of venting a gas bubble out of the fuel reservoir of a fuel cell for a portable electronic device according to an embodiment of the invention.

Reference is now made to FIG. 2, which illustrates highly schematically a gas bubble 107, which has been generated at the membrane electrode assembly 101.

Figure 3:
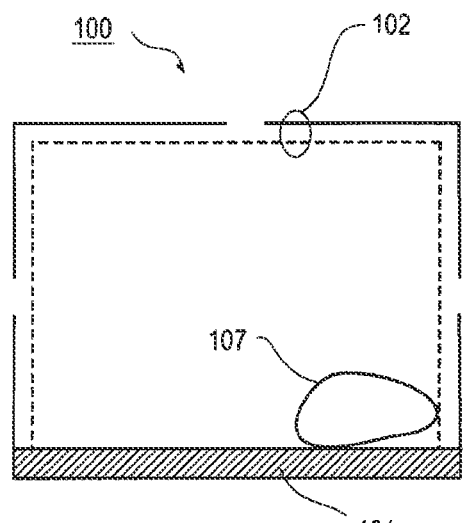
FIG. 3 illustrates a second step in the process of venting a gas bubble out of the fuel reservoir of a fuel cell for a portable electronic device according to an embodiment of the invention.

Reference is then made to FIG. 3, which illustrates how the gas bubble 107 has expanded, due to the continuous generation of gas during the normal operation of the fuel cell, such that part of the bubble touches upon the hydrophobic inner surface 103 of the fuel reservoir wall 102.

Figure 4:
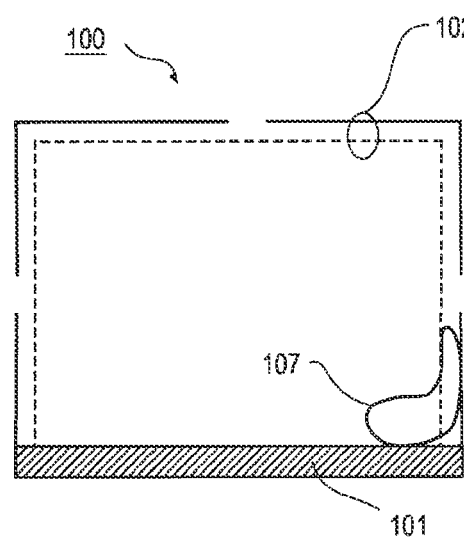
FIG. 4 illustrates a third step in the process of venting a gas bubble out of the fuel reservoir of a fuel cell for a portable electronic device according to an embodiment of the invention.

Reference is then made to FIG. 4, which illustrates how the gas bubble 107, due to the hydrophobic properties of the inner surface 103, is dragged towards the fuel reservoir wall 102 and starts to propagate through the gas permeable inner surface 103 of the fuel reservoir wall 102.

Figure 5:
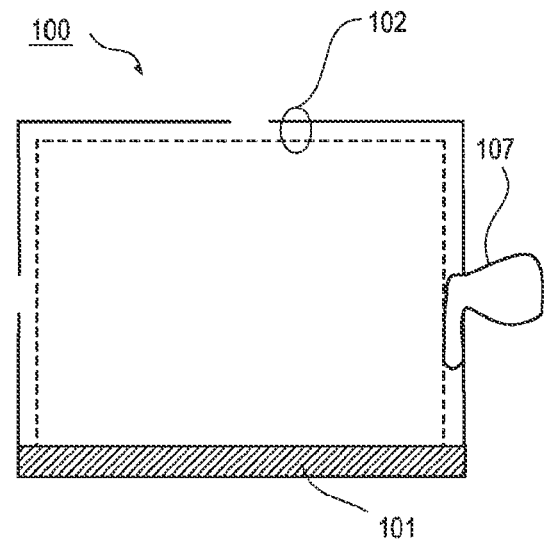
FIG. 5 illustrates a fourth step in the process of venting a gas bubble out of the fuel reservoir of a fuel cell for a portable electronic device according to an embodiment of the invention.
Figure 6:
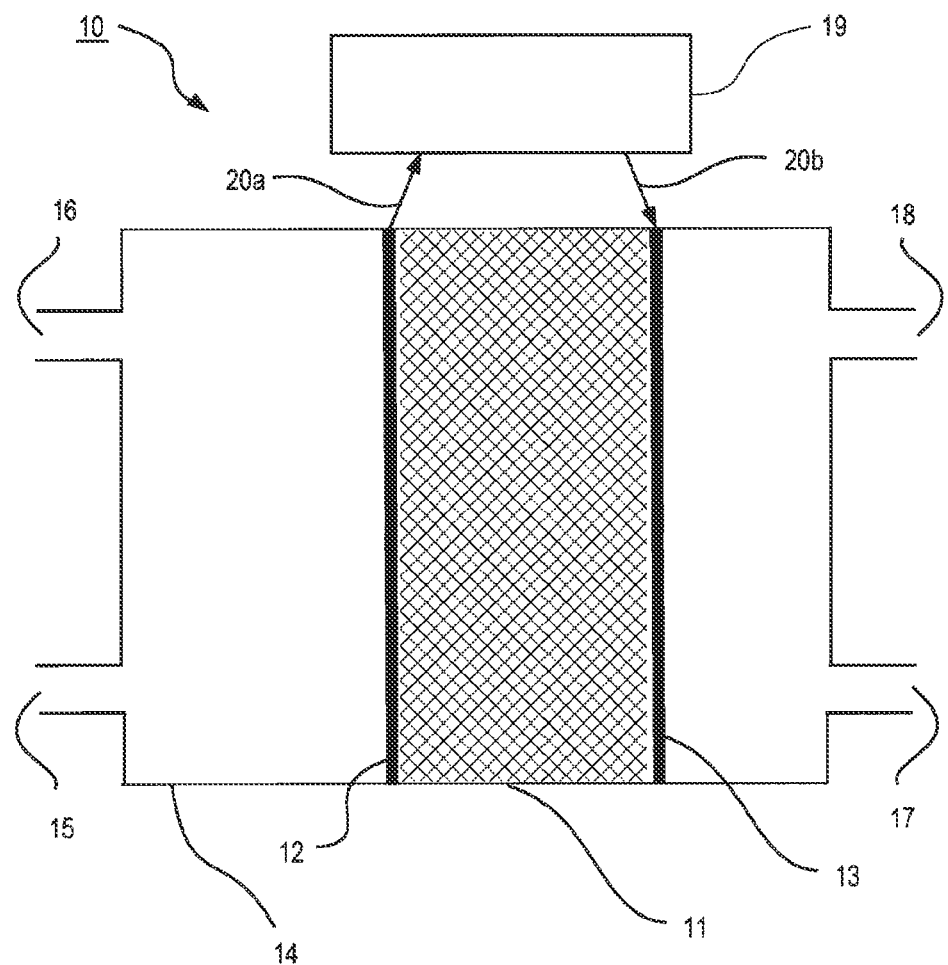
FIG. 6 illustrates highly schematically a fuel cell for a portable electronic device according to the prior art.

Reference is finally made to FIG. 5, which illustrates how the gas bubble 107 has propagated through the gas permeable interior of the fuel reservoir wall 102, in a direction substantially parallel with the inner surface of the fuel reservoir wall 102, and out through a gas permeable area 105 of the outer surface 104 of the fuel reservoir wall. Hereby it is illustrated how gas can be efficiently removed from a fuel cell reservoir using structures that require virtually no additional space.

The FIGS. 2-5 are for illustration purposes only, and it has therefore e.g. not been considered that the gas bubble 107, once it has propagated through the hydrophobic inner surface 103, is no longer a gas bubble because no or only very limited amounts of liquid is present in the porous fuel reservoir wall.

Other modifications and variations of the structures and procedures will be evident to those skilled in the art.

The invention claimed is:

1. A fuel cell for a portable electronic device comprising:
a liquid fuel reservoir and a membrane electrode assembly, wherein a liquid fuel reservoir wall and the membrane electrode assembly are adapted to provide the liquid fuel reservoir when attached to each other and wherein at least a part of the inner surface of said wall and at least a part of an outer surface of said wall are gas permeable, wherein
said wall is porous and adapted such that the area of the open parts of the inner surface of the wall is larger than the area of the open parts of said outer surface of the porous wall whereby diffusion of fuel through the wall is reduced as a consequence of the relative size of said areas, wherein
said wall is adapted to allow gas to enter said wall and to be transported along said wall in a direction substantially parallel with the plane of the wall and to leave said wall, and wherein
said wall is adapted such that the inner surface is hydrophobic.

2. The fuel cell according to claim 1, wherein the open parts of the inner surface of the wall are arranged such that efficient removal of gas from the fuel reservoir is substantially independent on the orientation of the fuel cell.

3. The fuel cell according to claim 2 wherein the open parts of the inner surface of the wall are arranged in the part of the fuel reservoir wall adjoining the membrane electrode assembly such that a gas bubble generated at the membrane electrode assembly will be efficiently removed from the membrane electrode surface once the gas bubble has expanded to a size where it touches upon said open parts of the inner surface of the wall.

4. The fuel cell according to claim 2 wherein the open parts of the inner surface of the fuel reservoir wall are arranged to substantially cover the whole inner surface of the wall.

5. The fuel cell according to claim 2 wherein at least 90% of the area of the inner surface of the fuel reservoir wall is gas permeable.

6. The fuel cell according to claim 1, wherein the area of the open parts of the outer surface of the wall is less than 2% of the area of the open parts of the inner surface of the fuel reservoir wall.

7. The fuel cell according to claim 1, wherein said porous wall is adapted such that the interior of the wall is hydrophobic.

8. The fuel cell according to claim 1, wherein the open parts of the outer surface are arranged in a number of separate areas, wherein said number is in the range between 3 and 30.

9. The fuel cell according to claim 1, wherein the gas permeable part of the outer surface is less than 5% of the total area of the outer surface of the fuel reservoir wall.

10. The fuel cell according to claim 1, wherein the area of the gas permeable part of the outer surface is more than 90% of the total area of the outer surface of the fuel reservoir wall.

11. The fuel cell according to claim 1, wherein the fuel reservoir wall has an average pore size in the range between 100 and 1000 nm and a porosity in the range between 50 and 95%.

12. The fuel cell according to claim 1, wherein the fuel reservoir wall provides an inner layer with an average pore diameter in the range between 10 nm-500 nm, and a layer thickness in the range between 1 um-50 um.

13. The fuel cell according to claim 1, wherein the volume of the fuel cell is in the range between 75 mm and 600 mm.

14. The fuel cell according to claim 1, wherein a part of the outer surface of the fuel reservoir wall has been surface treated in order to make the surface gas impermeable.

15. A portable electronic device comprising a fuel cell according to claim 1.

16. A portable electronic device according to claim 15, wherein said portable electronic device is a hearing aid.

17. A method of manufacturing a fuel cell reservoir according to claim 1 comprising the steps of:
  forming a three-dimensional computer model of the fuel reservoir wall,
  manufacturing a porous fuel reservoir wall using a process based on said three-dimensional computer model and selecting said process from a group of manufacturing processes comprising: selective laser sintering (SLS), metal injection molding (MIM) and ceramic injection molding (CIM),
  providing a membrane electrode assembly (MEA), and
  forming the fuel reservoir by attaching the MEA to the fuel reservoir wall.

18. The method according to claim 17 comprising the further steps of: mixing a metal powder with PMMA prior to metal injection molding and exposing the molded part to sintering conditions.

* * * * *